United States Patent
Ostendarp

(10) Patent No.: US 7,545,078 B2
(45) Date of Patent: Jun. 9, 2009

(54) ACTUATOR FOR MOVING A TOOL

(75) Inventor: Heinrich Ostendarp, Haan (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 11/932,335

(22) Filed: Oct. 31, 2007

(65) Prior Publication Data

US 2008/0134848 A1 Jun. 12, 2008

Related U.S. Application Data

(63) Continuation of application No. PCT/EP2006/008467, filed on Aug. 30, 2006.

(30) Foreign Application Priority Data

Sep. 8, 2005 (DE) .................... 10 2005 044 087

(51) Int. Cl.
*H01L 41/053* (2006.01)
*H02N 2/00* (2006.01)
(52) U.S. Cl. ............. 310/323.14; 310/312; 310/323.18; 310/348
(58) Field of Classification Search ............ 310/323.01, 310/323.02, 323.05, 323.13, 323.14, 323.18, 310/348
See application file for complete search history.

(56) References Cited

U.S. PATENT DOCUMENTS

| | | | |
|---|---|---|---|
| 1,866,529 A | 7/1932 | Farkas | |
| 3,511,323 A * | 5/1970 | Riley, Jr. | ................ 173/117 |
| 5,467,675 A | 11/1995 | Dow et al. | |
| 5,678,671 A * | 10/1997 | Leimbach et al. | ......... 192/70.22 |
| 6,720,707 B2 * | 4/2004 | Tamai et al. | ............ 310/323.12 |
| 2005/0023930 A1 | 2/2005 | Petrenko | |
| 2005/0052088 A1 | 3/2005 | Kakegawa et al. | |
| 2008/0111431 A1 * | 5/2008 | Dorel | ................... 310/26 |

FOREIGN PATENT DOCUMENTS

| | | |
|---|---|---|
| DE | 37 29 453 A1 | 3/1989 |
| DE | 198 56 738 C1 | 1/2000 |
| DE | 201 13 059 U1 | 11/2001 |
| DE | 102 30 022 A1 | 1/2004 |
| DE | 20 2004 011 815 | 3/2005 |
| EP | 0 402 011 | 12/1990 |
| JP | 2005-207482 | 8/2005 |

* cited by examiner

*Primary Examiner*—Thomas M Dougherty
(74) *Attorney, Agent, or Firm*—Harness, Dickey & Pierce, P.L.C.

(57) ABSTRACT

An actuator for moving a tool is disclosed, comprising a housing in which a tappet carrying a tool holder is guided axially movable, wherein the tappet is movable by means of a fast drive, e.g. by a piezo drive or by a nanotube drive, which is biased against a restoring force and which is dampened by a dampening element. Herein the fast drive may at least partially be received within a recess of the tappet which leads to a very compact design, in particular in combination with a coaxial dampening element. For guiding the tappet in axial direction alternatively a roller guide may be used (FIG. 3).

7 Claims, 3 Drawing Sheets

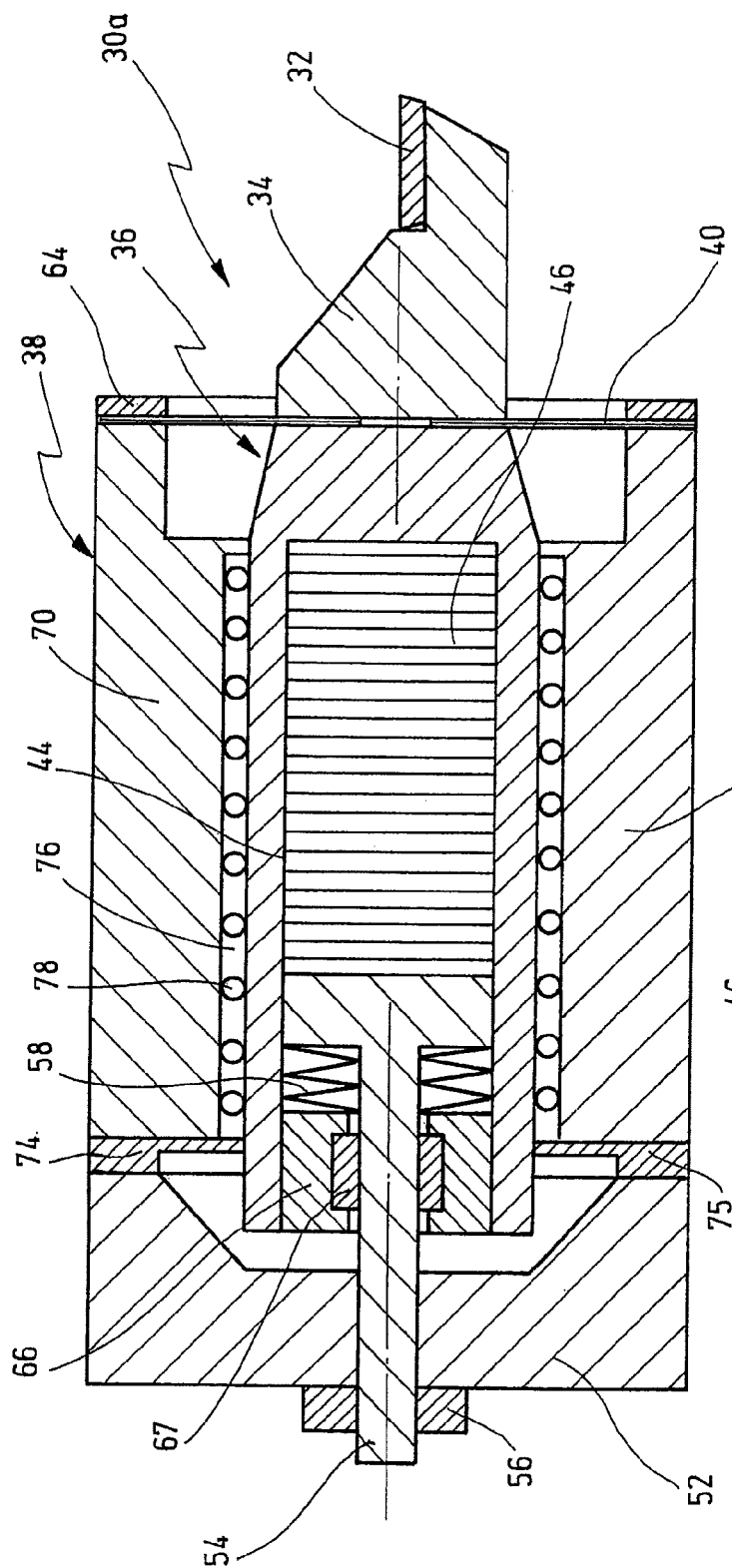
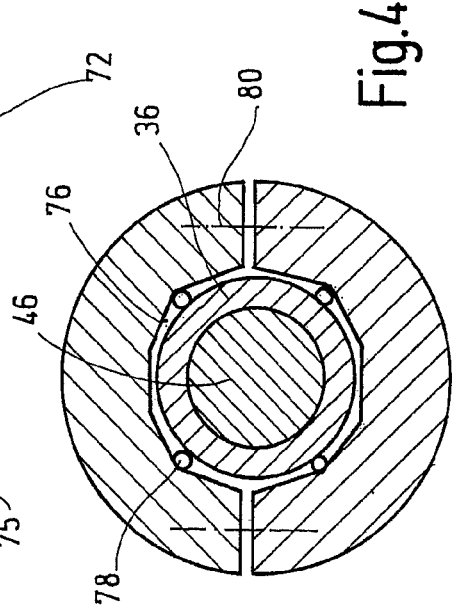
Fig. 3
Fig. 4

ACTUATOR FOR MOVING A TOOL

RELATED APPLICATIONS

This is a continuation application of copending International Patent Application PCT/EP2006/008467 filed on Aug. 30, 2006 and published in German, and claiming Convention priority of German patent application 10 2005 044 087.8 filed on Sep. 8, 2005 the subject matter of which is fully incorporated by reference herewith.

BACKGROUND OF THE INVENTION

The present invention relates to an actuator for moving a tool, the actuator comprising a housing on which is provided an axially movable tappet with a cutting tool holder, the tappet being moved using a rapid drive, preferably a piezoelectric transducer, which is biased against a restoring force and is, preferably, dampened by a damping element.

The invention further relates to a device for machining work pieces using such an actuator.

An actuator and a device of that kind are known from DE 20 2004 011 815 U1.

The known actuator is used in a lathe for producing very finely structured surfaces of rotationally symmetric or, especially, rotationally non-symmetric configuration.

To this end, the lathe comprises a spindle, which can be driven to rotate about its longitudinal axis and which carries a fixture for chucking a work piece, with an actuator provided with a rapid drive, for example in the form of a piezoelectric drive, for producing a rapid movement of the tool in a direction substantially perpendicular to the surface of the tool, while a second drive that produces a linear feed motion in the first direction allows the actuator to be positioned along a work piece surface to be machined. The rapid drive of the actuator is coupled with the tool via guide means that allow the tool to be fed in the axial direction of the rapid drive, against a restoring force, while exhibiting high rigidity in a plane perpendicular to that direction. The actuator comprises a sintered plate, permeable to air, which acts as a damping element via an enclosed air volume with a view to reducing the effects of cutting force noise in operation of the actuator.

It has been found in operation that such an actuator permits microstructured surfaces to be produced even when hard materials, such as steel or other materials are to be machined.

Another actuator of a similar kind, and a device for machining work pieces using an actuator, are known from the thesis by Robert Hilbing entitled "Genauig-keitssteigerung von Präzisionsdrehmaschinen durch aktive Kompensation dynamischer Störungen (Increasing the accuracy of precision lathes by active compensation of dynamic noise)", RWTH Aachen (Shaker Verlag, vol. 16/2004, D82 Diss. RWTH Aachen).

The actuator is used in combination with a lathe for producing high-quality rotationally symmetric surfaces. The actuator comprises a piezoelectric drive, which while being movably guided in the axial direction via a double-diaphragm spring, exhibits high rigidity in a direction perpendicular to that direction. A tool holding fixture is mounted on a tappet that encloses a piezoelectric drive, being directly connected with the latter. The piezoelectric drive in its turn is bonded to a base plate which is biased against the piezoelectric drive by a set of springs. A radial bearing is formed by two mutually spaced diaphragm springs on which the tappet is suspended.

A damping system is not provided in the case of that actuator. Further, the production of finely structured surfaces would require active electric compensation of dynamic noise which, due to the natural frequency of the spring mass of the actuator, that is to be suppressed, and due to the comparatively long transfer time between the sensor and the actuator, can be realized only at high expense, if at all. While the known arrangement is suited for machining non-ferrous metals, it is not suited for machining hard materials, such as steel.

SUMMARY OF THE INVENTION

In view of this it is a first object of the present invention to disclose an actuator that allows to work hard work pieces with high surface quality.

It is a second object of the present invention to disclose an actuator that allows to as work hard work pieces as quickly as possible.

It is a third object of the present invention to disclose an actuator that offers a very compact design.

It is a forth object of the present invention to disclose a device for machining work pieces using such an actuator.

These are other objects are achieved in the case of an actuator of the before-mentioned kind by an arrangement where the tappet is movably guided on the housing in the axial direction via rolling elements.

The object of the invention thereby is perfectly achieved.

This is so because seating the tappet in rolling elements permits extremely high acceleration of the actuator and, thus, machining of a work piece at high cutting speed. Further the actuator according to the invention exhibits very high rigidity in a plane perpendicular to its axial direction.

According to a further development of that embodiment, the tappet is movably guided by rolling elements in an axial direction between two housing elements that are clamped one to the other.

Relative movements between the housing parts can be prevented in this way. This in turn avoids any welding risks for the rolling elements at high loads in operation.

The rolling elements may, for example, be balls, rollers or spherical-roller elements or elements of any other form.

According to an alternative embodiment of the invention, the object of the invention is achieved by an arrangement where the rapid drive of an actuator of the before-mentioned kind is received in a recess in the tappet, at least in part, and the damping element is provided in coaxial arrangement with the tappet.

This also allows extremely high acceleration and, thus, high cutting speeds to be achieved. In addition, a very compact design is obtained.

The term "rapid drive" as used in the present invention is meant to describe a drive which while being capable of performing rapid controlled movements in the axial direction at high acceleration cannot perform any controlled movement in a plane perpendicular to that direction and is capable of absorbing very limited forces only.

Thus, the term "rapid drive" as used in the present invention is meant to describe a drive which permits movements to be performed at high acceleration in response to a suitable control signal. While drives of conventional machine tools achieve maximum acceleration rates of about 1.5 g (i.e. approximately 15 m/s$^2$) linear motors allow maximum acceleration rates of about 8 g (80 m/s$^2$).

A rapid drive in the meaning of the present invention allows an acceleration rate which is clearly higher, at least higher than 100 m/s$^2$. Preferably, the rapid drive allows acceleration rates which are clearly higher than that, for example at least 150 m/s$^2$ or at least 500 m/s$^2$, especially at least 1000 m/s$^2$.

Such high acceleration rates, which are necessary for high cutting speeds in the case of correspondingly demanding microstructures with high frequency contents, can be achieved for example with the aid or electromechanical transducers, such as piezoelectric drives.

According to an alternative embodiment of the invention, the rapid drive is configured as a nanotube drive.

A nanotube drive is an electromechanical transducer, having at least one layer comprising nanotubes, where the nanotubes of the layer have a preferential direction, averaged over the nanotube arrangements.

The nanotube drive may in this case comprise at least one layer with single-wall or multi-wall carbon nanotubes or with nanotubes consisting of other organic components, such as $BN$, $MoS_2$ or $V_2O_5$. In principle, a stacked structure of several layers may also be selected for the nanotube drive.

Nanotubes permit higher forces to be realized than piezoelectric drives. Likewise, nanotubes practically do not show any overshooting behavior, which is an advantage in cases where the microstructures to be produced have contents of extremely high-frequencies. A nanotube drive can be accommodated in sealed relationship in a cavity of the tappet, for example together with an electrolyte, and may be additionally sealed by a seal.

Any expansion of the volume of the electrolyte is converted in this case into an axial movement of the tappet.

Compared with this, one embodiment using a piezoelectric drive provides the advantage of a simple structure and low cost.

Of course, other configurations of the rapid drive are likewise imaginable, for example a hydraulic drive if and to the extent it meets the requirements regarding acceleration and sufficiently high rigidity.

The use of a damping element considerably reduces the effects of natural resonance and limits the overshooting behavior to acceptable values.

While in principle all suitable damping elements may be considered in this connection, it has been found that especially efficient damping can be achieved in an embodiment where the damping element is configured as squeeze-film damper where the damping effect can be optimally adapted to the demands placed on such an actuator when the latter is used for precision machining of work pieces made from hard materials. The use of a squeeze-film damper further allows an especially compact design of the actuator to be achieved.

It has further been found that the damping effect preferably should be adjusted to provide a maximum damping factor of approximately 0.7. Values in excess of that value normally lead to poor results. Depending on the type of material to be machined, the cutting depth, the cutting speed, etc., clearly different damping factors may also prove to provide the best results.

According to an advantageous further development of the invention, the rapid drive is received in a recess of the tappet.

This permits an especially compact design of the actuator.

According to a further preferred embodiment of the invention, the tappet is guided on a flexure, preferably a double-diaphragm spring.

This makes the tappet highly movable in the axial direction and at the same time highly rigid in a direction perpendicular to that direction.

According to another preferred embodiment of the invention, the rapid drive is fixed on the housing, and the tappet is biased against the rapid drive by a spring element, for example in the form of a set of springs.

This permits the necessary biasing of the rapid drive against a restoring force to be integrated in an especially compact fashion.

According to another preferred embodiment of the invention, the tappet is movably suspended on the housing in axial direction via a first spring suspension in the area of a first tool-side end of the tappet and via a second spring suspension in the area of the second end.

The rapid drive preferably comprises for this purpose a fixed end connected with the housing and a loose end connected with the tappet.

Further, the tappet preferably is biased toward the rapid drive, in the area of its second end, preferably by means of a set of springs.

These features permit an especially compact design to be realized.

The squeeze-film damper preferably is arranged in a cavity between the housing and the tappet and preferably comprises two coaxial surfaces which form between them a gap in which a fluid is enclosed.

This further supports an especially compact design of the actuator.

It is understood that the features of the invention mentioned above and those yet to be explained below can be used not only in the respective combination indicated, but also in other combinations or in isolation, without leaving the scope of the invention.

BRIEF DESCRIPTION OF THE DRAWINGS

Further features and advantages of the invention will become apparent from the description that follows of a preferred embodiment of the invention, with reference to the drawing. In the drawings:

FIG. 3 shows a longitudinal section through another embodiment of an actuator according to the invention; and FIG. 4 shows a cross-section through the actuator according to FIG. 3, in reduced scale.

DETAILED DESCRIPTION OF THE PREFERRED EMBODIMENT

Figure 1:
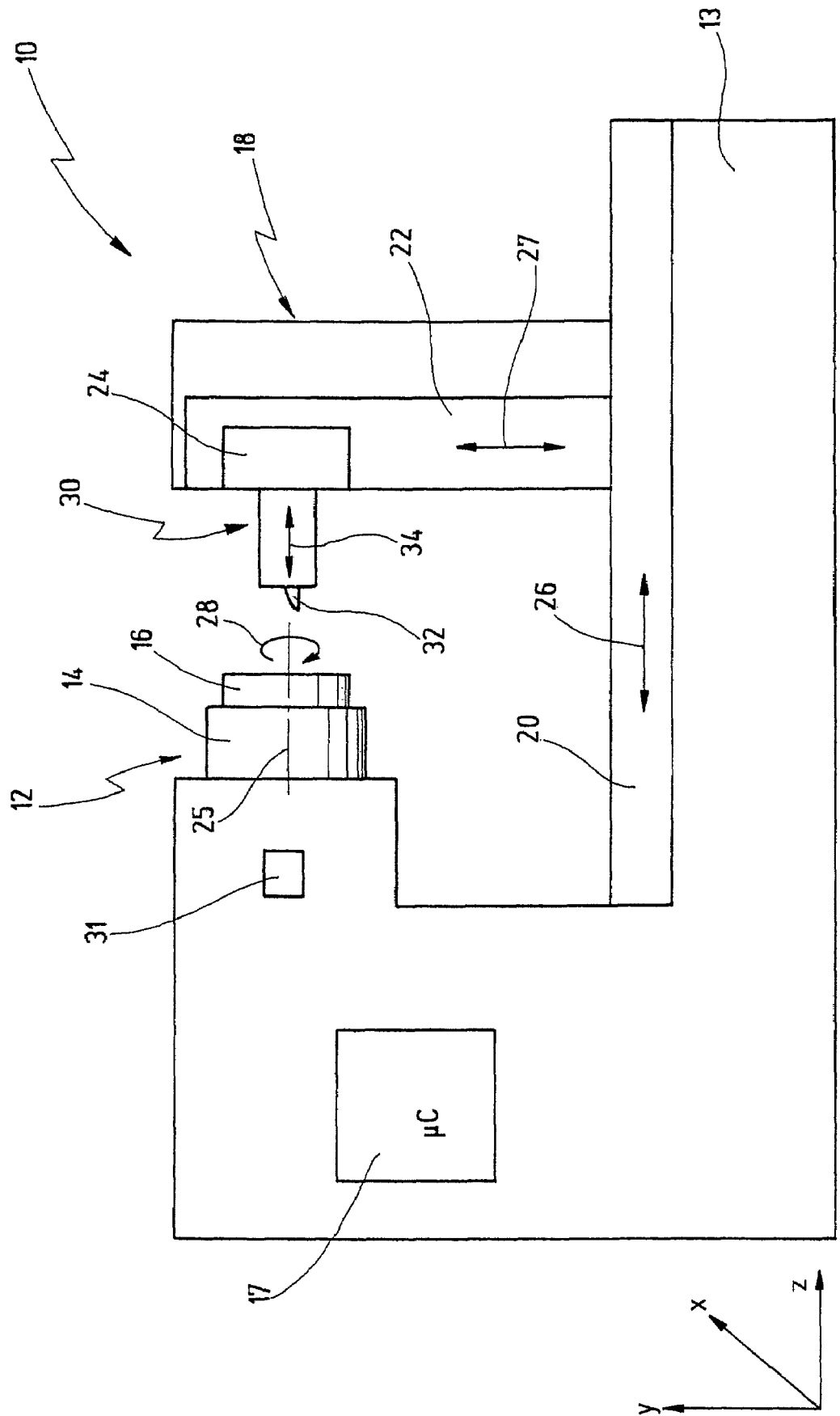
FIG. 1 shows a simplified diagrammatic representation of a device for machining a work piece using an actuator according to the invention.

FIG. 1 shows a diagrammatic illustration of a device for machining a work piece using an actuator according to the invention, indicated generally by reference numeral 10.

The device 10 according to the invention is a lathe which is equipped with an actuator 30 in order to permit rapid piezo-controlled movement of a tool 32 relative to a work piece 16. The device 10 comprises a spindle 12 that can be driven to rotate about its spindle axis 25, as indicated by arrow 28. The spindle 12 is provided with a fixture 14 in the form of a chuck for mounting the work piece 16.

Provided on a machine base 13 of the device 10 is a drive 20 provided along a guide extending in z direction (parallel to the spindle axis 25) by means of which a tool carriage 18 can be displaced in z direction, as indicated by double arrow 26. The tool carriage 18 is provided with a drive 22 by means of which a carriage 24 can be displaced in vertical direction (y direction), as indicated by double arrow 27. Finally, the carriage 24 is provided with a further drive which permits the carriage to be displaced in horizontal direction (x direction, transversely to the spindle axis 25).

The carriage 24 finally carries the actuator 30 by means of which the tool 32 can be additionally displaced in z direction, as is indicated by double arrow 34.

A central control, indicated diagrammatically by reference numeral 17, is provided for controlling the lathe and the actuator. The rotary position of the spindle 12 can be monitored using a rotary-position transducer 31.

For microstructuring the surface of the work piece 16 using the device 10, the work piece 16 can be driven by the spindle 12 to rotate about the spindle axis 25, while the actuator 30 is positioned in x direction, using the carriage 24, and the tool 32 is fed in x direction toward the work piece surface by the actuator 30, in response to the rotary position of the tool 16 determined by the rotary-position transducer 31 and the local coordinate of the actuator 30. It is possible in this way to microstructure the work piece surface and to produce rotationally symmetric and rotationally non-symmetric surface structures with high precision, as is generally known from DE 20 2004 011 815 U1, which latter is herewith incorporated in full by reference.

Using the design described above with reference to FIG. 1, work pieces can be machined in the way of a facing operation, which means that the work piece is driven to rotate and the tool 32 is moved transversely to the spindle axis, predominantly in the horizontal direction (x direction) or radially relative to the work piece 16, while the rapid feed motion of the actuator 30 occurs in the z direction, i.e. in the direction of the spindle axis 25. Additional movements are of course possible in other directions, for example in the z direction, if contours are to be machined.

It is understood that work pieces can be machined also in the way of a longitudinal turning operation. In this case, the positioning movement of the actuator 30 is effected by the drive 20 in z direction while the actuator 30 permits a feed motion to be effected in a perpendicular plane (x/y plane) relative to that direction. Conveniently, the actuator is positioned for this purpose on the carriage 24 so that the piezo axis is oriented in the x direction (or the y direction, if desired). Such an arrangement then also permits the outer surface or the inner surface, if desired, of a work piece to be microstructured in the way of an external turning or an internal turning operation.

The special structure of the actuator, which can be moved quickly in the direction of the piezo axis against a restoring force, but which exhibits high rigidity in a plane perpendicular to the piezo axis, will be described hereafter in more detail with reference to FIG. 2.

Figure 2:
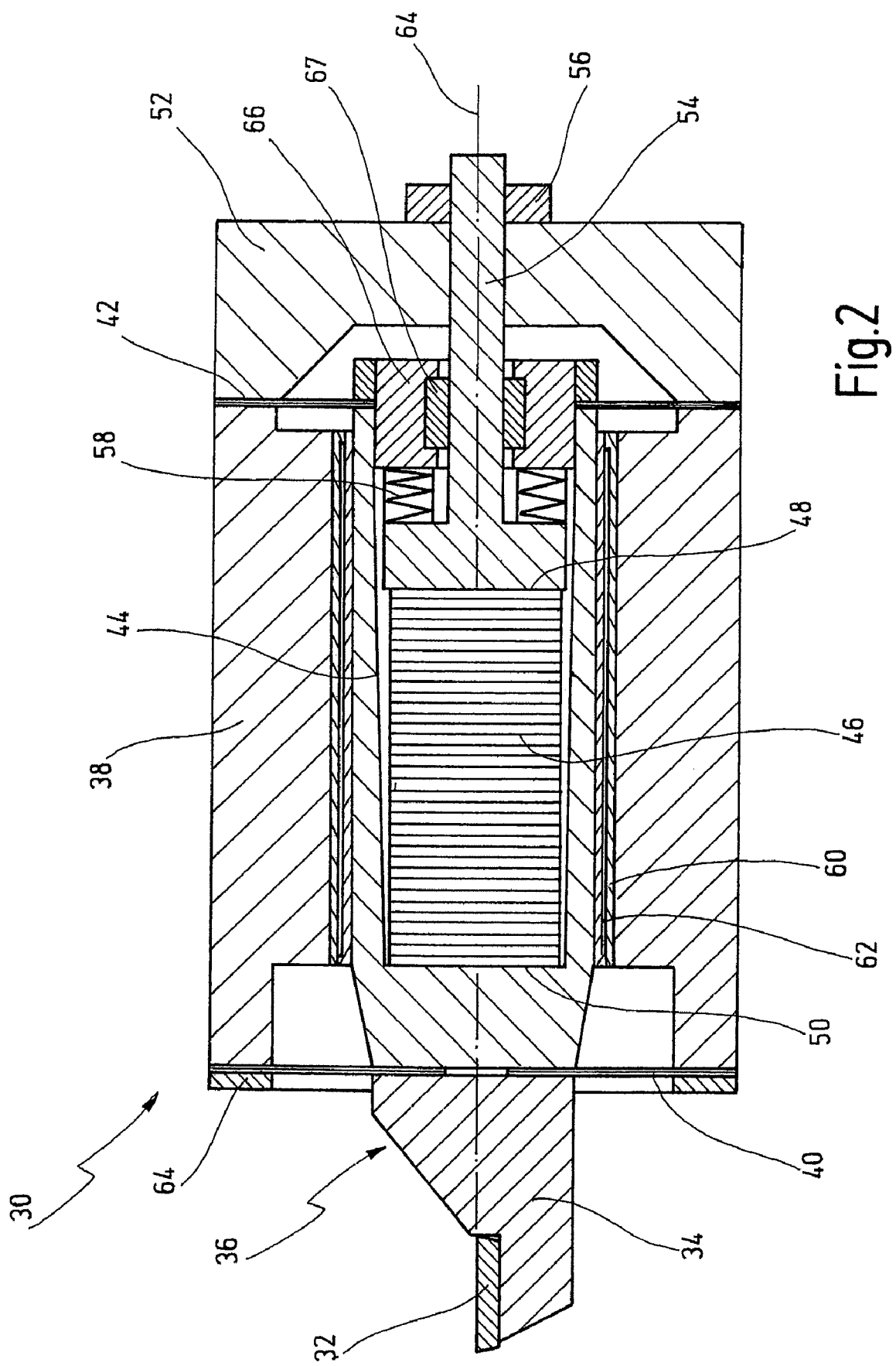
FIG. 2 shows a longitudinal section through a first embodiment of an actuator according to the invention as illustrated in FIG. 1.

The actuator illustrated in FIG. 2, indicated generally by reference numeral 30, consists essentially of a rapid drive 46, preferably in the form of a piezoelectric drive, supported on a housing 38 and acting upon a tool 32 via a flexure consisting of a first spring suspension 40 and a second spring suspension 42. The rapid drive 46 allows movements only in the axial direction, but is not capable of producing any actuating forces in a plane perpendicular to that direction. With the aid of the flexure 40, 42 it is guaranteed that the actuating movements of the rapid drive 46 in its axial direction can be transferred directly to the tool 32, while the actuator 30 as a whole exhibits high rigidity in a plane perpendicular to its longitudinal axis 64.

The forward end of the tappet 36 is provided with a tool holding fixture 34 arranged to receive a tool 32, for example in the form of an indexable insert. The arrangement is such that the cutting surface of tool 32 extends through the longitudinal axis 64 of the actuator 30.

The tool-side end of the tappet 36 is connected with the first spring suspension 40, which may consist of leaf springs made from spring steel of small thickness of a kind known for example as feeler gauge stock. The leaf springs are firmly clamped on the housing 38 by their ends, cross each other in the middle and are firmly connected with the tappet 36. For mounting the springs on the housing 38, an annular holder 65 may be provided, for example.

Alternatively, the first and the second spring suspension 40, 42 may be designed in any other form provided the demands placed on the dynamic performance of the actuator 10 are met.

The spring suspension 40, 42 may be configured as disc springs, for example.

In the area of its end opposite the tool holding fixture 34, the tappet is fixed on the second spring suspension 42 which, while having the same configuration as the first spring suspension 40, is adapted in size to the local geometric conditions. At its outer end, the second spring suspension 42 is firmly clamped between the housing 38 and a rear housing part 52 connected with the latter.

The tappet 36 exhibits a hollow cylindrical shape in its area between the two spring suspensions 40, 42, tapering slightly in the direction toward the tool holding fixture 34. The tappet 36 comprises a cylindrical cavity 44 in which the rapid drive 46 is received. Consequently, the rapid drive 46 is enclosed by the wall of the tappet 36 coaxially. The rapid drive 46 has a fixed end 48 which is firmly connected with the housing part 52 via a suitable mount 54 provided with a coupling piece 56. Further, the rapid drive 46 comprises a loose end 50, which is in contact with the end face of the cavity 44. Moreover, the tappet 36 is biased toward the mount 54 and, thus, toward the rapid drive 46, by a mount 66 by means of which it is fixed on the second spring element 42, via a set of springs 58, for example in the form of disc springs. Preferably, the mount 66 is likewise designed for sealing the rapid drive 46 and may comprise a separate seal 67 for this purpose.

For damping the tappet 36, there is preferably provided a squeeze-film damper 60 arranged between the outer surface of the tappet 36 and a cylindrical cavity of the housing 36. The squeeze-film damper 60 comprises two mutually coaxial sleeves that form between them a thin annular gap 62 in which a fluid is enclosed. The fluid preferably is a high-viscosity fluid, for example a gel.

According to an alternative embodiment of the invention, the rapid drive 46 is a nanotube drive. While otherwise the structure is identical to that of FIG. 2, the recess of the tappet accommodates in this case a nanotube drive instead of the piezoelectric drive. As the nanotube drive comprises an electrolyte in which the nanotubes are arranged in substantially axial alignment, it must be ensured by suitable sealing measures that the electrolyte cannot escape from the cavity 44 of the tappet 36 in which the nanotube drive is received. This may be ensured by an additional sealing element (not shown). As regards the structure of the nanotube drive, which may be configured, for example, as a stacked carbon nanotube drive, reference is made in particular to WO 2004/030210 A1, which is integrated herein in full by reference.

Another embodiment of the actuator according to the invention is illustrated in FIGS. 3 and 4 and is generally indicated by reference numeral 30a. In the Figures, corresponding parts are designated by corresponding reference numerals.

The actuator 30a according to FIG. 3 uses a roller bearing between the tappet 36 and the housing 38 for axial guidance. One thereby achieves very high rigidity in connection with even improved dynamic performance. The roller bearing may, for example, comprise balls 36, which are guided in a cavity 76 between the outer surface of the tappet 36 and the housing 38. The housing consists in this case of an upper half 70 and a lower half 72, which are screwed together at high force by suitable clamping screws so that any relative movements between the halves 70, 72 of the housing are prevented. It is possible in this way to avoid friction welding in the area of the balls 36.

Given the fact that axial guidance is guaranteed by the roller bearing, there is no need in the case of this embodiment for a second spring suspension 42, while the spring suspension 40 serves to produce the restoring force in axial direction, as in the case of the embodiment according to FIG. 2.

The rolling elements or balls 78 are secured from dropping out of the cavity 76 by cover elements 74, 75 provided on the respective housing halves 70, 72.

Torsion may be prevented by the set of springs 58 consisting of disc springs. Alternatively, the rolling elements or balls 78 may coact with guiding surfaces, for example flattened portions on the outer surface of the tappet 38, in order to prevent torsion.

It is understood that any other suitable rolling elements, such as cylindrical rollers, spherical-roller elements, or the like, may also be used instead of the rollers.

The rapid drive as such may again be configured either as a piezoelectric drive or as a nanotube drive.

Such an actuator permits an even higher natural frequency to be achieved, compared with the embodiment illustrated in FIG. 2, so that the dynamic performance is still further improved.

The described embodiment likewise comprises a suitable damping element intended to improve the overshooting behavior and the service life when machining hard work pieces, such as work pieces made from steel. The damping element likewise may be configured as a squeeze-film damper.

The damping arrangement limits the amplitude magnification, which otherwise would reach a factor of approximately 10 to 12 at the self-resonant frequency, to approximately the factor two at a nominal amplitude of 10 µm.

The invention claimed is:

1. An actuator for moving a tool, the actuator comprising:
   a housing;
   a tappet movably guided in an axial direction within said housing;
   a tool holder supported on said tappet;
   a rapid drive engaging said tappet and being movable against a restoring force; and
   a plurality of rollers engaging said tappet and said housing for movably guiding said tappet in said axial direction.

2. The actuator of claim 1, wherein said housing comprises two housing elements that are clamped one to the other.

3. The actuator of claim 1, wherein said rollers are configured as rollers selected from the group formed by balls, cylindrical rollers, spherical rollers, and barrel-shaped rollers.

4. The actuator of claim 1, further comprising a damper engaging said rapid drive for damping axial movement thereof.

5. The actuator of claim 4, wherein said damper is configured as a squeeze-film damper.

6. The actuator of claim 1, wherein said tappet is guided on a flexure which comprises two mutually spaced spring suspensions.

7. The actuator of claim 1, wherein said rapid drive is fixed on said housing and said tappet is biased against said rapid drive by a spring element.

\* \* \* \* \*